(No Model.) 2 Sheets—Sheet 2.
C. SCHMALZ & R. N. WATTS.
CONCAVE FOR THRASHING MACHINES.
No. 433,044. Patented July 29, 1890.
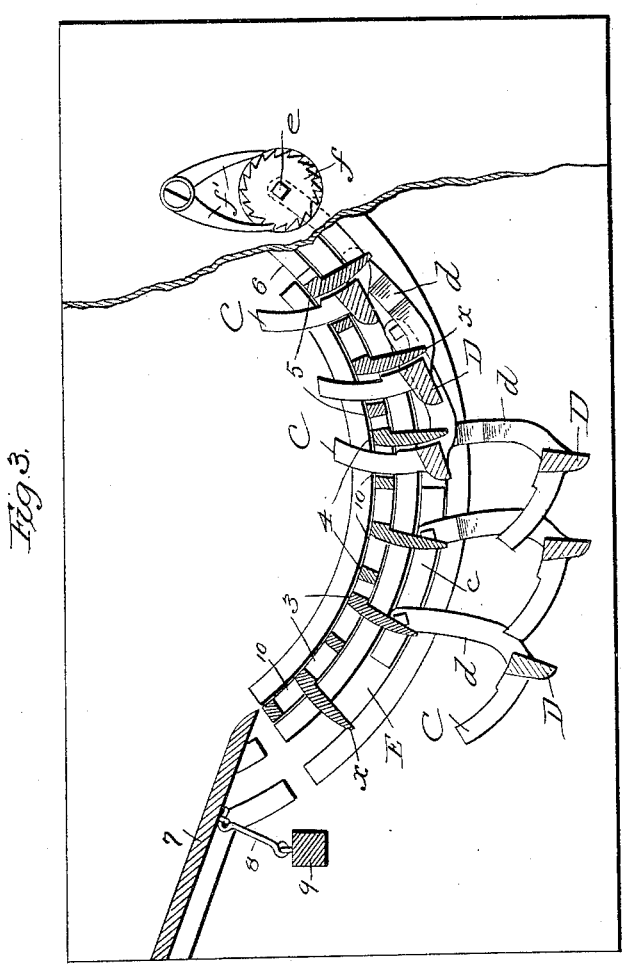

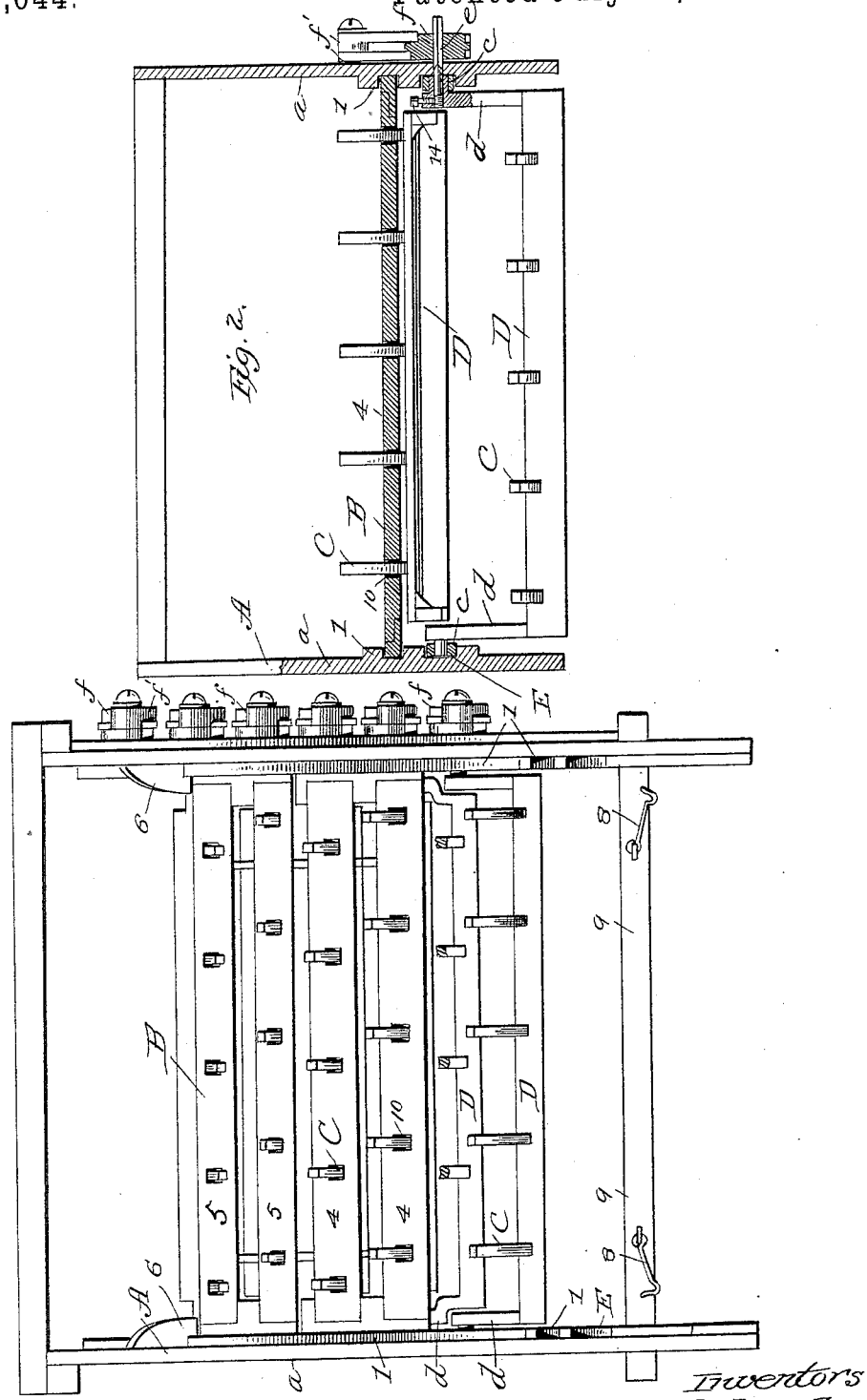

UNITED STATES PATENT OFFICE.

CHARLES SCHMALZ AND ROBERT N. WATTS, OF UINTAH, UTAH TERRITORY.

CONCAVE FOR THRASHING-MACHINES.

SPECIFICATION forming part of Letters Patent No. 433,044, dated July 29, 1890.

Application filed May 5, 1890. Serial No. 350,702. (No model.)

*To all whom it may concern:*

Be it known that we, CHARLES SCHMALZ and ROBERT N. WATTS, of Uintah, in the county of Weber and Territory of Utah, have invented a new and useful Improvement in Concaves for Thrashing-Machines, and we do hereby declare that the following is a full, clear, and exact description of the same.

The object of our invention is to provide a concave with teeth capable of adjustment in height to suit different conditions of work, to form said concave in sections which may be removed together with the teeth, in order that the concave may be adapted to various kinds of grains by replacing said removed sections and teeth with other sections and teeth of different sizes and arrangements, and to arrange the parts so that the said adjustments may be effected without stopping the machine.

In the accompanying drawings, Figure 1 is a plan view with one of the removable sections removed. Fig. 2 is a longitudinal section of the concave; and Fig. 3, a transverse section, partly in elevation.

In the drawings, A represents the frame adapted to receive the thrashing-cylinder of ordinary form. To the sides $a$ are secured curved ways 1, forming the arcs of circles, of which the central shaft is the center. In these ways the bottom B of the concave is supported, said bottom being removable and preferably formed in sections 3 4 5, as shown, said sections abutting against each other, the rear one abutting against suitable stops 6. The front section is held against movement in the ways by means of a wedge-board 7, bearing thereagainst and held by suitable hooks 8, secured to a cross-bar 9. When in place, the wedge-board bears against the front section and through it holds all the other sections in place, and when removed each section may be slid out of the ways, as desired, and removed from the machine. Openings 10 are formed in the bottom B and through these the teeth C project. These teeth are arranged in sets upon bars D, carried upon swinging arms $d$. These arms are journaled to slides $c$, movable in ways E below the ways 1 and concentric therewith. On one side the journals $e$ pass through the side of the machine, and each has a double ratchet $f$ with oppositely-arranged teeth thereon. Each of these ratchets is engaged by two pawls $f'$, one engaging with the teeth on the front side and the other with the teeth on the rear side, so that the double ratchet will be held against movement in either direction by means of said pawls. By turning the ratchet the arms $d$ will be swung on their journals and the set of teeth on the corresponding bar D will be raised or lowered through the bottom of the concave, and then by throwing in the pawls they may be held in any desired position to which they have been adjusted. The ratchet-journal is square at its outer end to receive a suitable wrench, and its inner end is screw-threaded into the swinging arm and held by a set-screw 14. When this ratchet-journal is removed, the corresponding set of teeth can be taken out by sliding it to the front in the curved way. On the under side of each of the concave sections a downwardly-projecting rib $x$ is placed, against which rests the bar D when the teeth are elevated. It will be seen from the above arrangement that the teeth may be adjusted without stopping the motion of the machine, or the teeth and concave bottom may be easily removed and replaced by other teeth and sections.

We claim as our invention—

1. In combination, a concave having a bottom composed of removable sections, ways for the sections, a series of bars D, having teeth, and a series of swinging arms carrying the bars D independently and pivoted at different points in said ways, said sets of swinging arms being independently removable, substantially as described.

2. A concave having a perforated bottom and ways for the teeth-holders, the slides in said ways, the swinging arms pivoted to said slides, and the bars D, carrying the teeth, substantially as described.

3. A concave having ways, a removable bottom held thereby, the ways for the tooth-holder, the slides therein, and the tooth-bars D, supported from the slides and adjustable vertically in relation to said slides, substantially as described.

In testimony whereof we have affixed our signatures in presence of two witnesses.

CHARLES SCHMALZ.
    R. N. WATTS.

Witnesses:
 PERCIVAL J. BARRATT,
 A. S. HINLEY.